(12) United States Patent
Okai

(10) Patent No.: US 7,228,821 B2
(45) Date of Patent: Jun. 12, 2007

(54) ADJUSTABLE QUICK RELEASE PET COLLAR

(75) Inventor: Takahide Okai, Round Rock, TX (US)

(73) Assignee: Radio Systems Corporation, Knoxville, TN (US)

( * ) Notice: Subject to any disclaimer, the term of this patent is extended or adjusted under 35 U.S.C. 154(b) by 77 days.

(21) Appl. No.: 11/156,023

(22) Filed: Jun. 17, 2005

(65) Prior Publication Data

US 2006/0283403 A1 Dec. 21, 2006

(51) Int. Cl.
*A62B 35/00* (2006.01)

(52) U.S. Cl. .................................... 119/863

(58) Field of Classification Search ........ 119/769–772, 119/774, 792, 793, 795, 797, 856, 863, 865; 24/164, 168, 170, 181, 171, 180, 176, 178, 24/163 R, 166, 167, 184, DIG. 31, 625, 573.1, 24/578.15, 579.09, 579.11, 616, 633, 634, 24/639, 646, 662; 54/19.1, 19.3, 21; 224/191, 224/219–222, 250, 255, 257, 258, 267, 910

See application file for complete search history.

(56) References Cited

U.S. PATENT DOCUMENTS

| | | | | |
|---|---|---|---|---|
| 5,154,660 A | * | 10/1992 | Snyder et al. | 119/771 |
| 5,659,931 A | * | 8/1997 | Anscher | 24/614 |
| 5,845,606 A | * | 12/1998 | Hartman | 119/856 |
| 5,970,921 A | * | 10/1999 | Fulton | 119/858 |
| 6,076,237 A | * | 6/2000 | Goorhouse | 24/200 |
| 6,108,821 A | * | 8/2000 | Malsoute | 2/321 |
| 6,192,835 B1 | * | 2/2001 | Calhoun et al. | 119/792 |
| 6,226,844 B1 | * | 5/2001 | Lerra et al. | 24/625 |
| 6,308,662 B1 | * | 10/2001 | Furman | 119/776 |

* cited by examiner

*Primary Examiner*—Thomas Price
(74) *Attorney, Agent, or Firm*—Pitts & Brittian, PC

(57) ABSTRACT

A pet collar which incorporates into a collar strap a buckle with its usual length adjustability features, and a quick release incorporated into the collar strap in intimate and operative association with the buckle. Once the length of the collar strap is initially adjusted, using the buckle, to the neck size of the pet for which the collar is intended, subsequent removal and reapplication of the collar to the pet is effected by the quick release aspect of the invention without disturbing the length adjustment established by the buckle.

12 Claims, 6 Drawing Sheets

ADJUSTABLE QUICK RELEASE PET COLLAR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

This invention relates to pet collars.

2. Description of the Related Art

Pet collars, especially collars for dogs, are designed for restraining the pet, hence collars for larger or stronger pets frequently are relatively stiff and made of a strong material such as leather or strong plastic. Most commonly, the collar is secured about a pet's neck by means of a buckle only. Such collars may be difficult to manipulate when attaching or removing the collar from the pet and adjusting the collar to fit properly about the pet's neck, especially when dealing with a hyperactive or otherwise uncooperative pet.

Commonly relatively large buckles are employed for releaseably fastening the collar about the neck of the pet. Buckles have, over time, become a desired distinguishing feature of a pet collar and therefore their elimination is not desired in view of their usefulness in adjusting a collar to fit a given pet. In certain pet collars, the buckle also served as the attachment location for a leash for the pet.

However, irrespective of the desire to retain the usefulness of buckles known in the art for pet collars, there remains the problem of threading a loose end of the collar through the buckle and inserting the retention prong of the buckle through a throughbore defined through the thickness of the collar each and every time the collar is either adjusted about the pet's neck or when removing and later reattaching the collar about the pet's neck. This activity can become frustrating to both the pet and the owner by reason of the relative stiffness of the collar and its resistance to being bent as is required to engage the loose end of the collar within the buckle. Still further, each time a buckle-type collar is applied about the pet's neck, the owner must deal with the adjustment of the collar about the pet's neck. Still further, removing a buckle type collar from a pet in an emergency situation is of concern.

Similarly, other collars employ quick release clips that simplify the process of attaching and removing the collar from around a pet's neck. Unfortunately, quick release clips generally increase the complexity of length adjustment by requiring the collar to be threaded through a retention port several times. The length of the collar is subject to unintended adjustment if slippage occurs, especially when improperly threaded.

BRIEF SUMMARY OF THE INVENTION

In accordance with one aspect of the present invention, there is provided a pet collar which incorporates into a collar strap a buckle with its usual length adjustability features, and a quick release incorporated into the collar strap in intimate and operative association with the buckle. Once the length of the collar strap is initially adjusted, using the buckle, to the neck size of the pet for which the collar is intended, thereafter, removal and reapplication of the collar to the pet is effected by means of the quick release aspect of the invention.

In accordance with one aspect of the present invention, the quick release includes a male element and a mating female element. The male element is made part and partial of the buckle and the female element is made part and partial of that end of the collar strap opposite the buckle. This intimate association of the quick release with the buckle and the collar strap positions the quick release in a location which is easily and quickly tactilely identifiable by the pet owner, especially in the event there arises an emergency which calls for the collar to be removed quickly. Further, the relationship of the present quick release with the buckle is established such that there is significant rigidity of the quick release relative to the buckle, again, aiding in the actuating the quick release, either during a routine placement or removal of the collar as well as during an emergency situation.

In the present invention, this association of the quick release with the buckle may take the form of a direct connection between the buckle and the quick release, thereby providing for close proximity of the quick release to the buckle. Moreover, this direct connection may include a connector which inhibits rotational movement of the plane of the buckle about relative to the plane of the quick release, while permitting angular movement of the plane of the buckle relative to the plane of the quick release, thereby further aiding in quick grasping of the quick release and the buckle and enhanced speed of operation of the quick release by reason of their relative non-rotational interconnection.

In one embodiment of the present invention, the female element of the quick release is inter-molded with that end of the collar strap opposite the buckle, thereby creating a bulbous type enlargement on this "loose" end of the collar strap. As with the buckle/male element subassembly, this structure of the female element and the end of the collar strap also makes the female element readily and easily identifiable, both visually and tactilely, and readily grasped for joining this female element to the male element or disconnecting these elements from one another independently of the buckle itself. This structure of the present invention has been found to be advantageous to the extent that a user can readily apply or remove the present collar from a pet even when the user's arms are encircling the pet's neck such that the user's hands and the buckle/quick release elements are hidden from the view of the user.

DETAILED DESCRIPTION OF THE INVENTION

Figure 1:
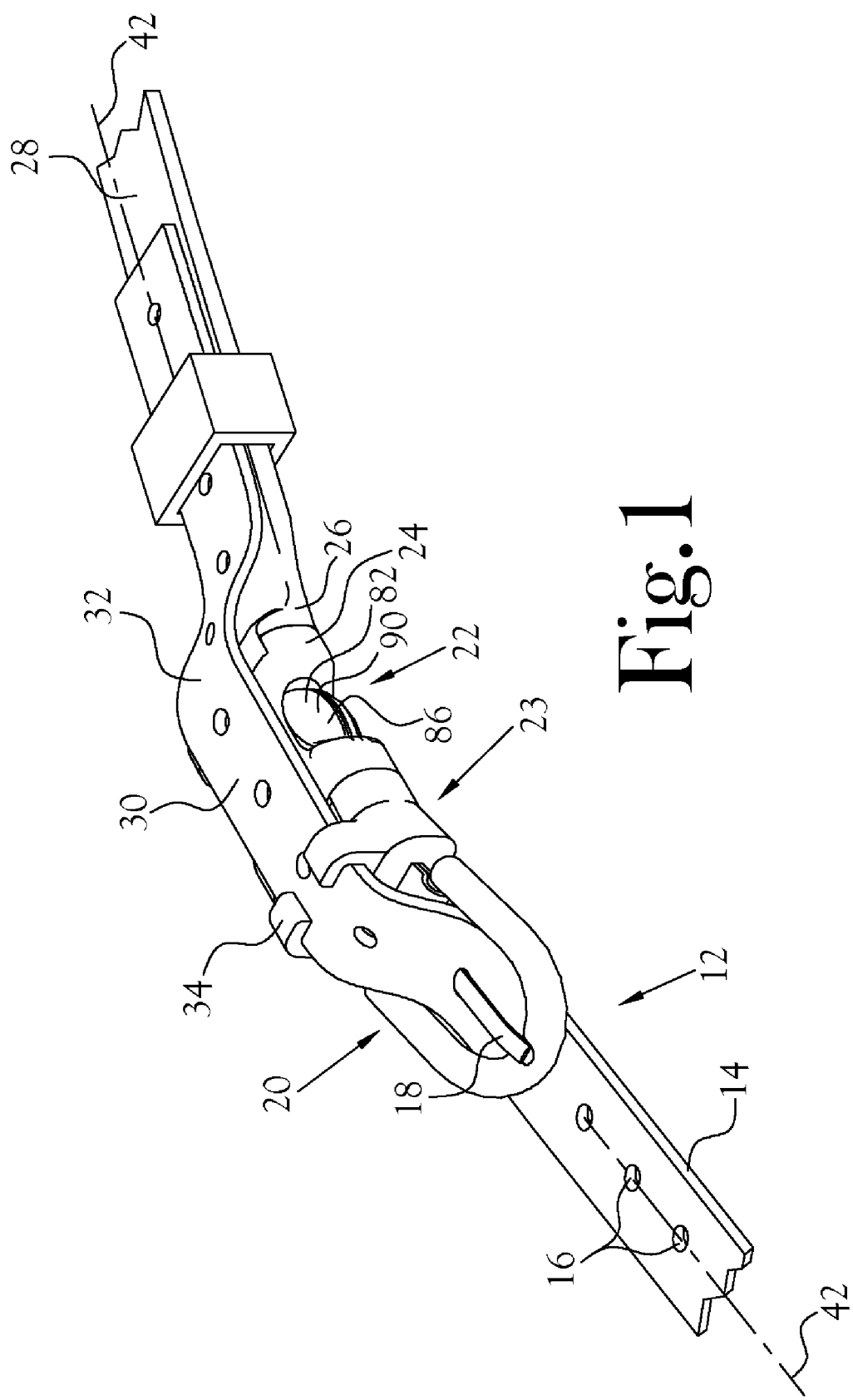
FIG. 1 is a perspective representation of one embodiment of a pet collar of the present invention having a buckle and associated quick release associated therewith.
Figure 4:
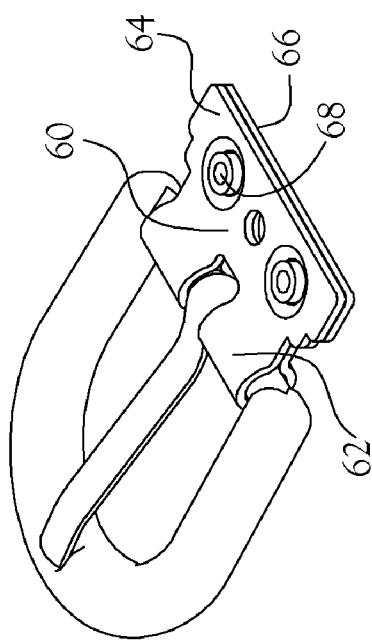
FIG. 4 is a perspective view of one embodiment of a buckle having an attachment flange for anchoring the buckle with a male element of a quick release.

Referring initially to FIGS. 1 and 4, in one embodiment of the pet collar 12 of the present invention, there is provided an elongated collar strap 14 adapted to encircle the neck of a pet. The depicted collar strap includes a plurality of throughbores 16 (typical) through the thickness thereof at spaced apart locations along the length of the collar strap for the receipt therethrough of the retention prong 18 of a buckle 20 to adjust the collar to the circumference of a pet's neck as is well known in the art.

Further, in the depicted embodiment, there is provided a quick release 22 comprising a male element 23 and a female element 24. The female element 24 is anchored at a first end 26 thereof to a first end 28 of the collar strap. The second and opposite end 30 of the collar strap is received through the buckle whose retention prong is positioned in one of the throughbores along the length of the collar strap.

In the depicted embodiment, the collar strap is of a polymeric material that is strong enough to effectively restrain a pet and sufficiently flexible to permit that bending of the collar strap which is required to thread the second end 30 of the collar strap through the buckle and effect an initial adjustment of the collar to fit about the neck of the pet for which the collar is intended. After the collar has been placed in the desired encircling relationship about the neck of a pet, that portion 32 of the second end of the collar strap which passes through and projects beyond the buckle is further threaded through a retainer 34 for such loose end.

Figure 9:
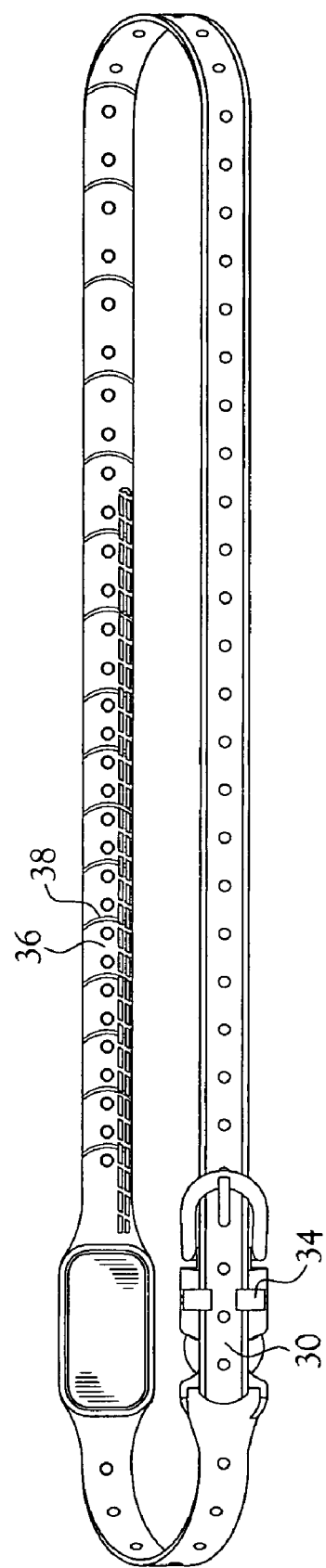

For aesthetic and other purposes, in one embodiment, the inner surface 36 of the collar strap is embossed at spaced apart locations along the length of the collar strap with a crescent design 38, as seen in FIG. 9, to provide a guide for the user to cut away any excess length of the loose end 32 of the collar strap once the fit of the collar onto the pet has been completed. This crescent design permits the user to follow the crescent with a cutting instrument and generate a rounded distal end of the collar which is free of sharp or pointed areas.

In certain instances, the collar strap may be employed as a mounting platform for an electronic device (not shown) designed to impart a correction stimulus to the pet in response to a trigger signal. An example of a typical correction situation is when the pet approaches a forbidden area, such as the perimeter of the yard of a residence. To this end, the collar must be of sufficient stiffness as to prevent rotation about its longitudinal axis 42 when such a device is mounted on the collar. Such stiffness of the collar militates against the ease with which the collar may be threaded through the buckle in the course of the collar being applied to a pet's neck, especially a hyperactive pet. In the present invention, such threading of the collar strap through the buckle need only be carried out a single time, namely, when the collar is applied to the pet's neck for the first time. Thus, the present invention aids in minimizing the difficulty of repeated trial and error applications and removals of the collar from the pet when attempted to fit the collar to the pet's neck, hence negating the repeated frustration of threading a stiff collar strap through a buckle, etc.

In one aspect of the present invention, there is provided a buckle 20 having a generally D-shape geometry which includes a first side leg 46 having first and second opposite ends 48 and 50, and a second opposite side leg 52 having first and second ends 54 and 56, a distal cross member 44 extending between and interconnecting the first ends 48 and 54 of first and second opposite legs 46 and 52, respectively, and adapted to act as a rotational stop for a retention prong 18 which is rotatably mounted on a proximal cross member 58 which extends between the first and second ends 50 and 56, respectively, of the first and second side legs 46 and 52, respectively, of the buckle. In the prior art, one end of a collar strap is wrapped about the proximal cross member and back upon itself where it is fastened to capture the proximal cross member in the bend so created in the end of the collar strap. The retention prong of the buckle is fed through one of the throughbores in the collar strap adjacent that end of the collar strap which wraps the proximal cross member so that the retention prong is free to rotate about the proximal cross member with a distal end and thereof free to engage a throughbore in that end of the collar strap which is threaded through the buckle. Thereupon when a force tending to withdraw the opposite end of the collar from the buckle is applied to the collar strap, the distal end of the retention prong engages the distal cross member of the buckle and thereby captures such opposite end of the collar strap within the buckle. All of this action is common in the course of connecting opposite ends of a prior art buckle-only type collar strap to one another when fastening a collar about the neck of a pet.

Contrary to the prior art, in the present invention, the proximal cross member 58 of the buckle is provided with an elongated, preferably metal, connector strip 60 having a width approximately equal to the length of the proximal cross member 58 of the buckle and of a length sufficient to permit the central portion 62 of the strip 60 to be wrapped about the proximal cross member 58 of the buckle with its opposite end portions 64, 66 projecting from and beyond the proximal cross member. In this embodiment, the retention prong 18 of the buckle projects through the connector strip 60 and the collar strap in position to enter a throughbore 16 in that end 28 of the collar strap which is threaded through the buckle.

The opposite end portions 64, 66 of the connector strip are overlaid one upon the other and bonded together as by brads or other fastening means, to preclude the strip from falling away from its encircling relationship to the proximal cross member of the buckle. The connector strip of the present invention may rotate about its associated proximal cross member 58, thereby allowing the retention prong 18 which leads through the strip to rotate freely about the longitudinal axis of the proximal cross member. Alternatively, the throughbore through the thickness of the strap may be sufficiently large and elongated as to permit free rotation of the retention prong independently of the connector strip.

Figure 2:
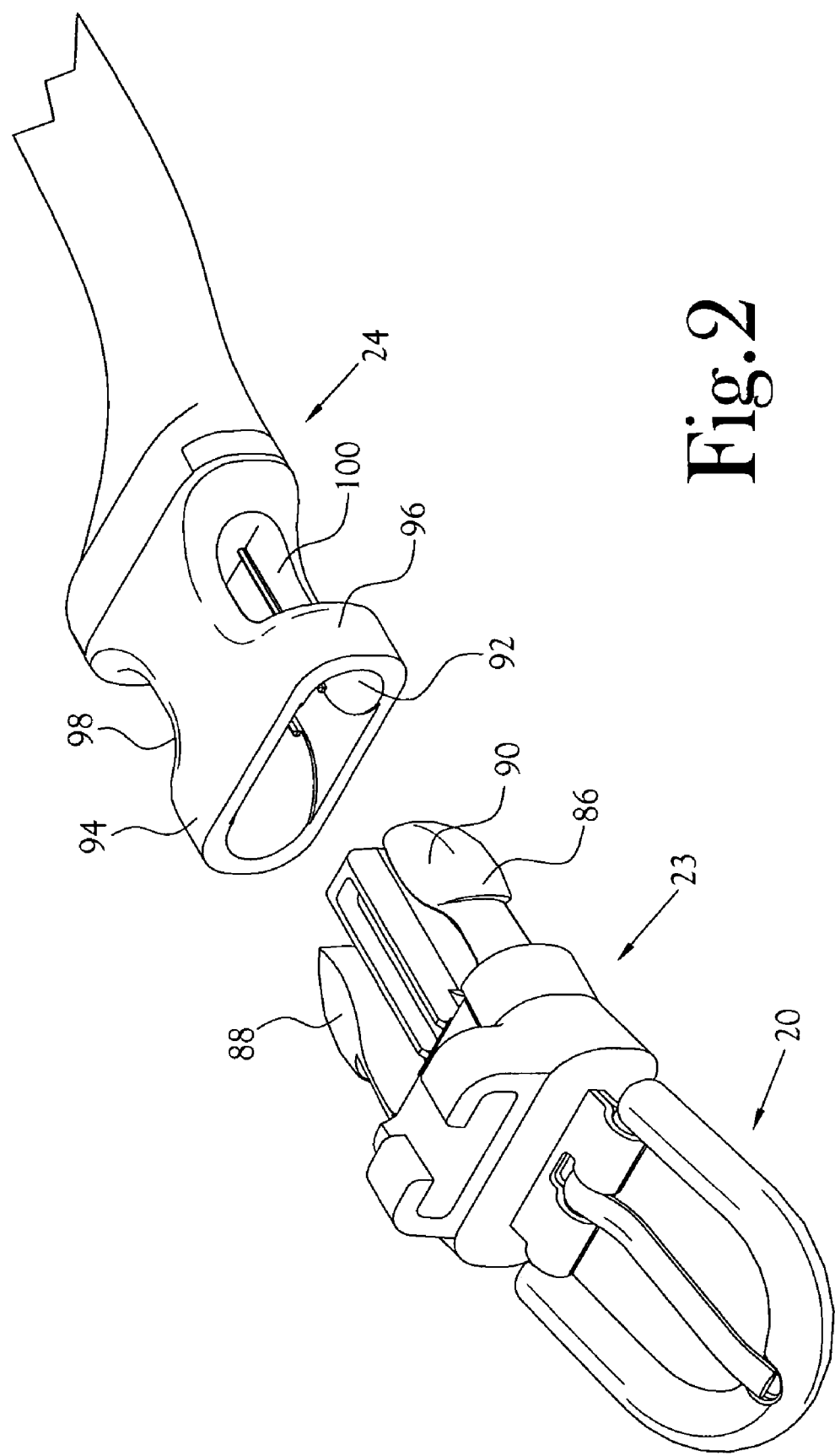
FIG. 2 is a perspective view of a buckle and male and female elements of one embodiment of a quick release of the present invention, the male and female elements being disconnected.
Figure 5:
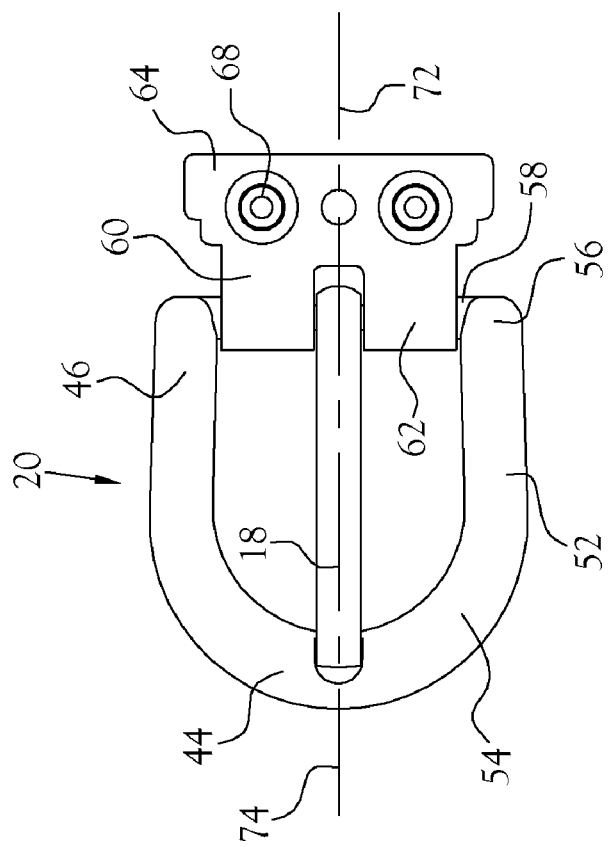
FIG. 5 is a top plan view of the buckle of FIG. 4.
Figure 6:
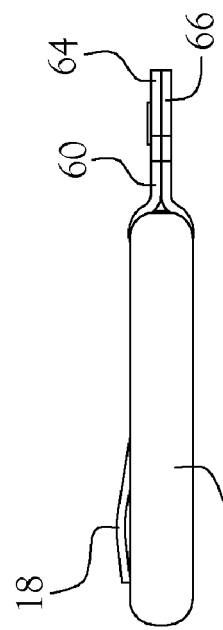
FIG. 6 is a side elevation view of the buckle of FIG. 4.
Figure 7:
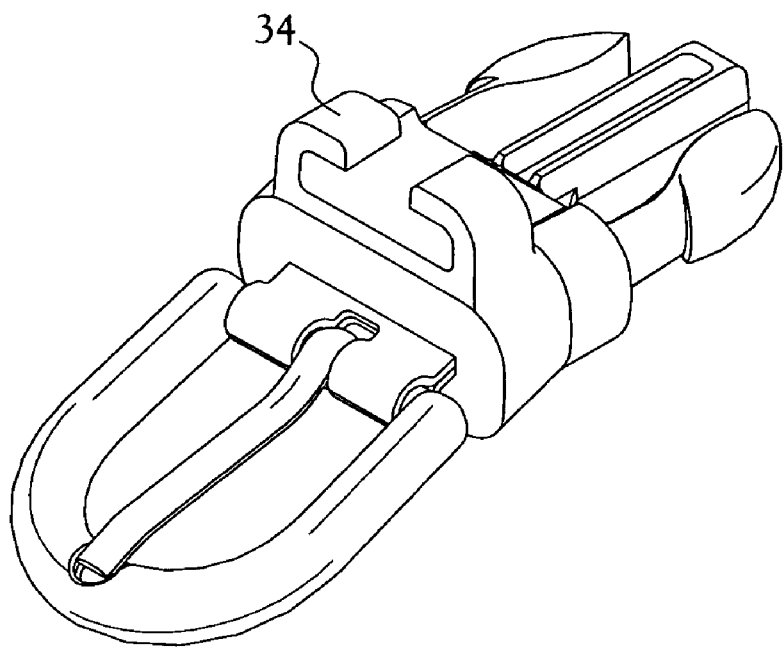
FIG. 7 is a perspective view of a buckle as depicted in FIG. 4 inter-molded with a male element of a quick release of one embodiment of the present invention.
Figure 8:
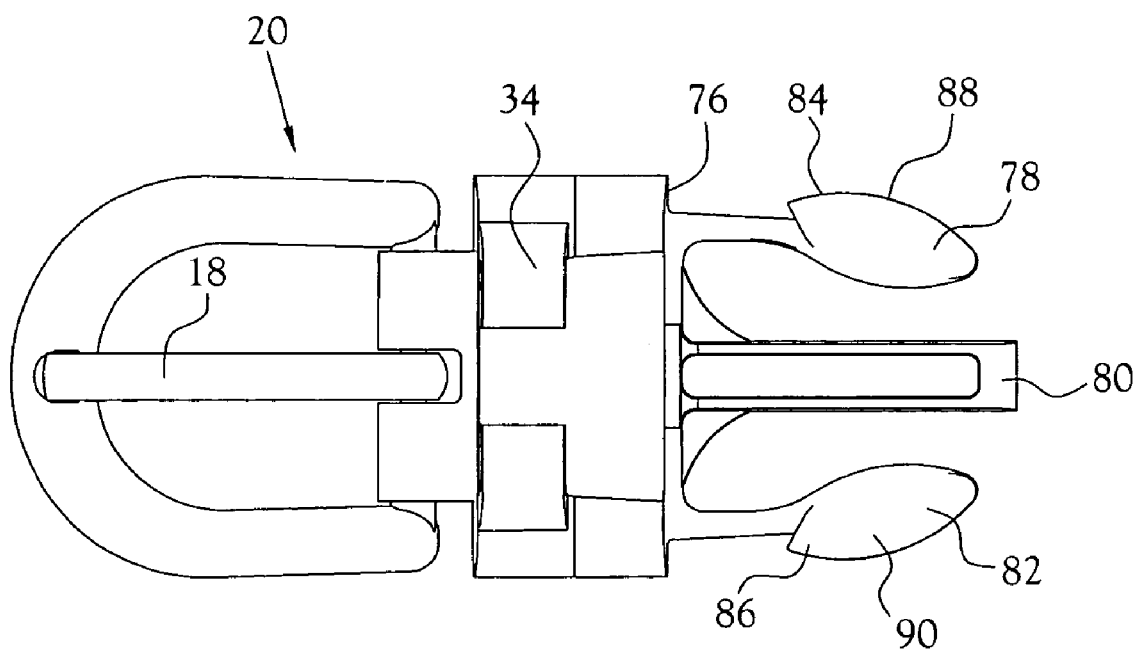
FIG. 8 is a top plan view of the buckle and male element depicted in FIG. 7; and, FIG. 9 is a perspective view of one embodiment of a collar of the present invention showing details of the collar inner surface.

As depicted in FIGS. 2, and 5–6, the outboard ends 64, 66 of the connector strip 60 are of a substantially planar geometry, overlie one another in face to face relationship and are anchored to one another while in such relationship, thereby defining a potential connector between the buckle and a male element 23 of a quick release. Specifically, the overlying ends of the strip may be pierced and then riveted 68 to one another, fastened with brads or otherwise secured in their overlying relationship.

In the present invention, the connector as seen in FIGS. 1–3, and 10, the male element is substantially planar and occupies a first plane. Similarly, the female element 24 is substantially planar and occupies a second plane. Further the connector strip, when folded with its end portions in overlying relationship; occupies a third plane. As depicted in the several Figures, the interconnection is intermolded with one end of the male element 23 of the quick release, thereby securing the proximal cross member of the buckle to the male end of the quick release. Moreover, this interbonding rigidities the connector with respect to one end 76 of the male element of the quick release, hence rigidifies the male connector and buckle against rotation relative to one another about their respective longitudinal axes 72, 74. By this means, when a user grasps the buckle/male element subassembly, there is substantial rigid material which enables the user to securely grasp the subassembly and manipulate it to effect a quick connection of the male and female elements of the present invention, even when dealing with a less than cooperative pet.

In the depicted male element of the present invention, that end 76 of the male element opposite the buckle is provided with a plurality of connector prongs 78, 80 and 82. In the depicted embodiment there is a central prong 80 and first and second opposite side prongs 78 and 82, respectively, all aligned substantially within the same plane. Each of the first and second side prongs includes a projection 84 and 86, respectively, adjacent the distal end 88, 90 of a respective prong.

The female element 24 of the quick release of the present invention includes an elongated slot 92 adapted to receive therein the plurality of prongs of the male element. On each of the opposite sides 94, 96 of the female element, there is provided openings 98, 100, each of which is engagable by a respective one of the projections of the side prongs of the male element to effectively and securely, but releasably lock the male and female elements to one another. Since these projections are exposed to the user, to release the male and female elements from one another, the user need only to press inwardly on the exposed projections thereby forcing them from their engagement with the side wall openings in the female connector whereupon the male element readily withdraws from its interconnection with the female element.

Figure 3:
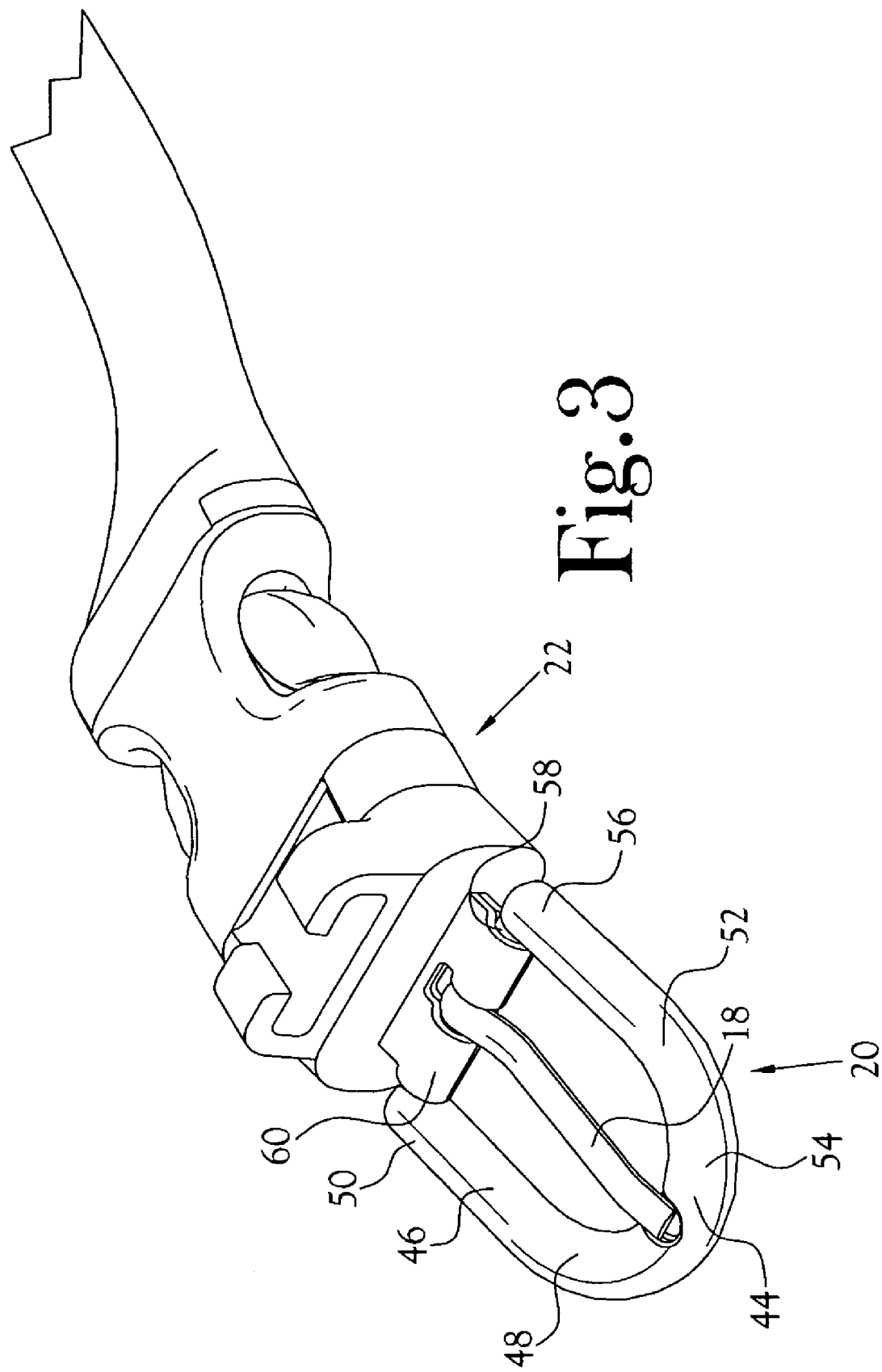
FIG. 3 is a perspective view of the buckle and male and female elements depicted in FIG. 2 connected to one another.

As seen in FIGS. 1–3 in the depicted embodiment, that end of the female element which is opposite the buckle is integrally intermolded with the outboard end of the collar strap. As with the intermolding of the male connector with the buckle, this intermolding of the end of the collar strap with the outboard end of the female connector serves to provide bulk and stiffness between the female element and the collar strap, thereby again providing the user with a area of enlarged volume for ready grasping and aligning the male and female elements in the course of connecting the male and female elements of the quick release. Moreover, this construction permits the user to grasp the female element and the end of the collar strap with one hand, while using their thumb and first finger to apply release pressure against the projections of the prongs which reside in the registering side wall openings in the female connector and effect quick release of the male and female connectors, hence release of the collar from about the pet's neck, all without disturbing the fit adjustment of the collar which was established in the course of the initial application of the collar to the pet's neck.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A pet collar comprising:
    an elongated strap having a plurality of spaced apart throughbores located along the length of said elongated strap and adapted to receive the retention prong of a buckle therethrough;
    a buckle having first and second spaced apart side legs, each leg including respective first and second ends, a first cross member interconnecting respective ones of said first end to one another, and a second cross member interconnecting respective ones of said second ends to one another, and a prong having a first end rotatably mounted on said second cross member and projecting therefrom to be received within a selected one of said plurality of spaced apart openings for establishing a fit of said collar about the neck of a pet;
    a male element including a body portion, a first end and a second end, and at least two connector prongs projecting from said second end of said male element in position to be received by a female element, each of said connector prongs including a lateral projection extending from said connector prong;
    connector means interposed between said buckle and said male element, said connector means comprising a planar member hingedly engaging said second cross member of said buckle and extending therefrom to engage said first end of said male element, whereby said buckle and male element are non-rotational with respect to one another about their respective longitudinal axes; and,
    a female element having first and second ends, said second end being intermolded with that end of said collar strap opposite said buckle, said first end of said female element having defined therein an outwardly opening elongated slot having a perimetrical wall and adapted to receive therein said at least two connector prongs of said male element, and including an opening defined through said perimetrical wall which registers with a respective one of said projections extending from a respective one of said connector prongs to releasably latch said male and female elements to one another.

2. The pet collar of claim 1 wherein said buckle occupies a first plane and said male member occupies a second plane and said connector means provides for hinged movement of said first and second planes relative to one another.

3. The pet collar of claim 2 wherein said connector means occupies a third plane which is substantially parallel to said second plane, said third and second planes being rigidly connected thereby precluding rotation of said first plane relative to said second plane about their respective longitudinal axes.

4. The pet collar of claim 1 wherein said male element is of a polymeric material and said connector means is intermolded with said male element.

5. The pet collar of claim 4 wherein said female element is of like polymeric material as said collar strap and comprises a continuation of that end of said collar strap opposite said buckle.

6. The pet collar of claim 4 wherein said indicia comprise a crescent design extending laterally across the elongated collar strap and are spaced apart at substantially equally spaced apart locations along the length of said collar strap.

7. The pet collar of claim 1 wherein said collar strap is an elongated flat strap of a polymeric material having first and second opposite flat surfaces and including indicia imprinted on at least one of said flat surfaces which provide a guide to severing the collar strap.

8. A method for quick connection and disconnection of an elongated collar strap having a buckle length adjustment feature and having first and second opposite ends, said method comprising the steps of:
   providing a female element on a first end of said elongated collar strap, said female element including means for releasably receiving a male element in releasable locking engagement therewith;
   providing a male element having first and second opposite ends, said second end thereof including at least one connector prong projecting therefrom and adapted to be received in releasably locking relationship with said female element;
   said male element occupying a first plane and said female element occupying a second plane; and,
   interposing a connector means occupying a third plane between said first plane and said second plane, said connector means providing for hinged movement of said first and second planes relative to one another while precluding rotational movement of said first and second plane relative to one another about their respective longitudinal axes.

9. The method of claim 8 and including the step of forming said female element as an intermolded continuation of a first end of said collar strap.

10. The method of claim 8 and including the step of intermolding said connector means with said first end of said male element.

11. The method of claim 8 wherein said collar strap is formed of a moldable polymeric material.

12. A collar assembly for use with an animal, said collar assembly comprising:
   a collar having a first end, a second end, and a lateral axis, said collar defining a plurality of throughbores proximate to said first end, said plurality of throughbores aligned along said lateral axis;
   a quick release having a first element permanently connected to said collar second end and a second element adapted to releasably engage said first element; and,
   a buckle having a first end permanently connected to said quick release second element and a retention prong adapted to releasably engage said plurality of throughbores, said buckle adapted to receive said collar first end.

* * * * *